Patented Mar. 27, 1951

2,546,872

UNITED STATES PATENT OFFICE 2,546,872

HYDROXY-COMPOUNDS OF THE BENZOXANTHENE SERIES AND PROCESS OF MAKING SAME

Max Schmid, Riehen, and Hans Johner, Basel, Switzerland, assignors to Ciba Limited, Basel, Switzerland, a Swiss firm No Drawing. Application September 24, 1948, Serial No. 51,106. In Switzerland October 10, 1947

8 Claims. (Cl. 260—335)

According to this invention valuable hydroxy-compounds of the benzoxanthene series are made by treating with an agent capable of eliminating hydrogen halide a compound obtainable by reacting a diazotized 1-halogen-8-amino-naphthalene with a para-quinone followed by reduction.

The condensation products used as starting materials may be prepared by the reaction of a diazotized 1-halogen-8-amino-naphthalene with a para-quinone, for example in an aqueous medium, at room temperature or a slightly raised temperature or advantageously at a temperature ranging from 5° C. to 15° C. The diazotized 1-halogen-8-aminonaphthalenes may contain as the halogen, for example, chlorine or bromine, and may contain further substituents which do not affect the reaction, for example, further halogen atoms or alkyl or alkoxy groups. As examples of such 1-halogen-8-aminonaphthalenes there may be mentioned: 1-chloro-8-amino-naphthalene, 1:4-dichloro-8-amino-naphthalene and 1-chloro-2-methoxy-8-aminonaphthalene.

As para-quinones to be reacted with the above diazo-compounds there may advantageously be used those which contain at most two condensed rings and few or no substituents, especially benzoquinone, monochlorobenzoquinone or 1:4-naphthoquinone.

The reaction of the diazotized amine with the quinone takes place with the elimination of nitrogen and leads very probably to products having the constitution:

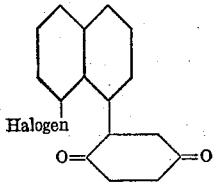

By treatment with a reducing agent, for example, iron and hydrochloric acid or sodium hydrosulphite, the two oxo-groups may be converted into hydroxy-groups.

The 1-halogen-8-(2':5'-dihydroxy)-1'-phenyl-naphthalenes obtainable in this manner and having the structure

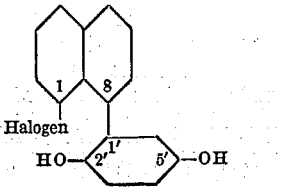

are then treated in accordance with the present invention with an agent capable of eliminating hydrogen halide. As such an agent there may be used, more especially, a strong alkali such as an alkali hydroxide especially sodium hydroxide or potassium hydroxide. These hydroxides may be used with advantage in the form of melts poor in water at a temperature above 100° C., for example, at about 150-250° C. In some cases heating with a concentrated solution of an alkali hydroxide for example, caustic soda solution of 30 per cent. strength, suffices.

By the elimination of hydrogen halide in accordance with the invention there is formed a heterocyclic six-membered ring and a compound is obtained having the structure of 1:9-benzoxanthene

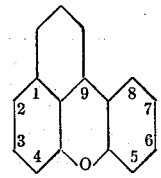

which contains a hydroxyl group as a substituent in the 7-position.

The nomenclature used in the present specification is based upon the generally used numbering of the xanthene ring

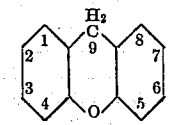

(see Patterson's Ring Index, No. 2000). According to this system of nomenclature, 1:9-benzoxanthene signifies that a six-membered benzenoid carbon ring is fused on at the position 1 and 9 of the xanthene nucleus.

According to Patterson's Ring Index, No. 2792, the 1:9-benzoxanthene skeleton may also be called benzo[kl]xanthene and the said skeleton may be numbered as follows:

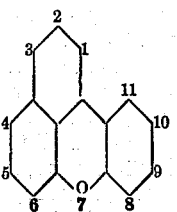

By this system of nomenclature, the products of the present invention may be designated 10-hydroxy-benzo[kl]xanthenes.

The hydroxy-compounds of the benzoxanthene series obtainable by the present invention are new and are valuable intermediates, especially for the manufacture of dyestuffs.

It is known that 3-hydroxy-diphenylene oxide, which contains a five-membered ring, and also a few of its substitution products can be made by condensing a diazotized ortho-chloraniline with 1:4-benzoquinone to form an ortho-chlorophenyl-benzoquinone, reducing the latter to a 2-(2'-chlorophenyl)-1:4-hydroquinone, and bringing about ring closure by means of an alkali melt to form a 3-hydroxy-diphenylene oxide. It could not be foreseen that the reaction of the present invention leading to the formation of a six-membered ring would be possible or that valuable products distinguished by various properties would be obtained.

The following examples illustrate the invention, the parts and percentages being by weight:

Example 1

177.5 parts of 1-chloro-8-aminonaphthalene are finely pulverized and stirred well with 300 parts of hydrochloric acid and 700 parts of ice, and then diazotized by adding dropwise a solution of 70 parts of sodium nitrite. After ½ hour the excess of mineral acid is neutralized with 200 parts of sodium acetate, and the whole is filtered to remove any impurities. The diazo-solution is then allowed to run slowly into a solution of 108 parts of benzoquinone in 6000 parts of water at 25° C. Reaction occurs with the evolution of nitrogen. The whole is allowed to stand for several hours longer until the reaction has ceased. The red-brown precipitate is then separated by filtration, washed well with water, and subjected to reduction in the moist state. For this purpose a reduction liquor is prepared by stirring 300 parts of iron powder in 3000 parts of alcohol with the addition of 30 parts of hydrochloric acid of about 30 per cent. strength.

The whole is boiled under reflux, while stirring, for ¼ hour, and then the brown-red precipitate described above is slowly introduced in portions. When the addition is complete, boiling is continued for 3 hours longer, and then 20 parts of anhydrous sodium carbonate are added and, after 10 minutes, the whole is filtered. The alcohol is removed from the filtrate by evaporating the latter to dryness. The residue which remains behind is a dark brown oil, which solidifies on cooling in a partly crystalline form. This oily crude product is then introduced, without further purification, into a melt consisting of 500 parts of caustic soda and 50 parts of water at 200° C. There are formed first a brown-yellow salt and then a dark brown magma with the separation of salt-like crystals. The melt is finally maintained for a short time at about 180° C., and then poured into 7500 parts of water. Undissolved material is removed by filtration and the solution is rendered distinctly acid with hydrochloric acid. A grey sandy precipitate separates out. After a short time the precipitate is separated by filtration, washed and dried. As this crude 7-hydroxy-benzoxanthene is still impure, it is distilled, preferably under reduced pressure, during which impurities cause some initial foaming but subsequently remain in the flask in the form of a non-volatile crumbly residue and pure 7-hydroxy-1:9-benzoxanthene

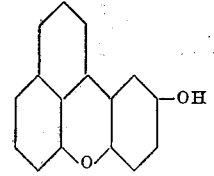

passes over at 250–257° C. under 7 mm. pressure in the form of a yellow oil which rapidly solidifies as a crystalline incrustation. For the purpose of further purification the product may be recrystalized from alcohol or chlorobenzene to form pale greenish yellow needles or prisms melting at 171–173° C. Solutions of the product in alcohol or chlorobenzene are slightly yellow and exhibit a blue-violet fluorescence. It dissolves in sulphuric acid to give an intense yellow coloration and a strong green fluorescence. It dissolves very easily in dilute caustic soda solution to give a slightly yellow solution having a blue-green fluorescence. Excess of caustic soda solution precipitates the sodium salt from concentrated solutions in the form of slightly yellow lamellae having a lustre resembling mother-of-pearl.

Example 2

177.5 parts of 1-chloro-8-aminonaphthalene are ground wet in 500 parts of water in a porcelain ball mill, the mixture is then filtered with suction and the filter residue is pasted while moist with 300 parts of water. There are then added 600 parts of ice and, after brief stirring, 250 parts of concentrated hydrochloric acid are added. A thick suspension of the hydrochloride is obtained. The latter is stirred until it again becomes thin, and if desired a further 100–200 parts of ice are added. A solution of 69 parts of sodium nitrite in 200 parts of water is then run in very rapidly in a thin stream. After a few minutes there is obtained a clear yellow solution of the diazo compound. The whole is stirred for about 20 minutes longer and the greater part of the free mineral acid is neutralized by slowly adding about 33 parts of sodium bicarbonate until the solution turns Congo paper slightly violet. Small quantities of impurities are separated by filtration and the clear diazonium solution is slowly run beneath the surface into a suspension of 108 parts of benzoquinone in 500 parts of water and 100 parts of sodium bicarbonate. During this operation the whole is cooled externally with ice so as to maintain the temperature between about 5 and 15° C. Condensation occurs with the evolution of nitrogen and the formation of a precipitate of a yellow to yellow ochre color. The introduction of the diazonium solution should take about 2–4 hours. It is continuously consumed and can no longer be detected a short time after the introduction has finished. Finally, the whole is stirred for about 1 hour longer, and then filtered and washed well with water. The brown yellow precipitate is subjected to reduction in the wet state. For this purpose it is stirred in 500 parts of chlorobenzene and 500 parts of water, and 300 parts of sodium hydrosulphite are added in one batch. The color immediately becomes pale and the mixture heats up spontaneously to about 55° C. The whole is stirred until the temperature falls of its own accord. The mixture is then distilled with steam until all the chlorobenzene has been driven off and the aqueous suspension is stirred until it is cool. The pale brown, almost white, precipitate is then separated by filtration, and introduced into a melt of 500 parts of caustic soda and 100 parts of water at 170–180° C. The duration of the treatment is about ½ hour. A brown-yellow friable mass is formed. The temperature is maintained at 180–185° C. for about ¼ hour longer and the melt is then poured into 6000 parts of water. Any undissolved constituents are removed by filtration and the solution is rendered distinctly acid with hydrochloric acid. A grey or grey yellow sandy precipitate separates out. After a short time it is separated by filtration, washed and dried. This crude 7-hydroxy-benzoxanthene is still impure and can be purified in the manner described in Example 1.

Example 3

212 parts of 5:8-dichloro-1-aminonaphthalene are finely ground with water, then separated by filtration and stirred with 600 parts of water and 600 parts of ice to form a fine suspension. 250 parts of concentrated hydrochloric acid are then added in one batch. A thick stiff mass is obtained. The mass is stirred until it becomes thinner, and then 200 parts of ice are added and a solution of 69 parts of sodium nitrite in 200 parts of water is run in in the course of about 30 seconds in a thin stream. After 20 minutes the excess of mineral acid is approximately neutralized by slowly adding about 33 parts of sodium bicarbonate, and small quantities of impurities are removed by filtration. The yellow diazonium solution is slowly run in in the course of about 3 hours under the surface into a suspension of 108 parts of benzoquinone in 500 parts of water and 100 parts of sodium bicarbonate while stirring well and cooling externally with ice. Condensation occurs with the evolution of gas and the formation of a precipitate which is initially pale yellow and later becomes yellow ochre in color. The temperature is about 5–20° C. The diazo compound is continuously consumed and can only be detected at the end of the introduction but then disappears in a short time. The whole is then stirred for about 1 hour longer, and then filtered and the filter residue washed well several times with water. In the reduction which follows, the yellow brown precipitate is used directly in its crude and moist condition. For this purpose it is stirred wth 500 parts of chlorobenzene and 500 parts of water and 300 parts of sodium hydrosulphite are added in one batch. The color of the solution immediately becomes pale with the spontaneous evolution of heat, the temperature increasing to about 50° C. After a short time a pale brown almost white precipitate separates. When the temperature has dropped of its own accord, the mixture is subjected to steam distillation until all the chlorobenzene has been driven off, and the precipitate is stirred in 1000 parts of caustic soda solution of 30 per cent strength. The mixture is slowly heated to the boil. The reaction involving ring closure generally sets in at about 90–100° C. and spontaneously maintains the whole solution at the boil for 15 minutes. The whole is then maintained at the boil for a further ¼ hour by the application of heat, and thereafter poured into 5000 parts of water. Undissolved impurities are removed by filtration and the filtrate is rendered distinctly acid with hydrochloric acid. A grey to grey yellow precipitate separates out. After a short time the precipitate is separated by filtration, washed well and dried. This crude 2-chloro-7-hydroxy-1:9-benzoxanthene of the formula

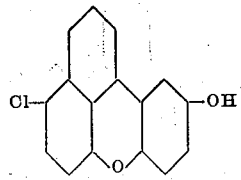

can be purified by crystallization from benzene, chlorobenzene or alcohol. In the pure state it consists of pale yellow lamellae or short prisms melting at 210–211° C. Solutions of the product in organic solvents are pale yellow and have a blue-violet fluorescence. In concentrated sulphuric acid it dissolves with a green fluorescence and an orange yellow coloration, which soon changes to brown. In dilute caustic soda solution it dissolves with a pale yellow coloration and a green fluorescence. An excess of caustic soda solution precipitates the sodium salt from concentrated solutions in the form of pale yellow lamellae having a lustre resembling mother-of-pearl.

Example 4

207.5 parts of 1-chloro-8-amino-2-methoxynaphthalene are finely ground with water, and then filtered and stirred with 400 parts of water and 600 parts of ice to form a fine suspension. 250 parts of concentrated hydrochloric acid are then added in one batch. The whole is stirred until the initially stiff mixture has become thin, a further 200 parts of ice are added and there is then run in rapidly in a thin stream a solution of 69 parts of sodium nitrite in 200 parts of water. The whole is stirred for about 20 minutes, the excess of mineral acid is then almost completely neutralized by means of about 33 parts of sodium bicarbonate, and small quantities of impurities are removed by filtration. The clear diazonium solution is run, while stirring, under the surface into a suspension of 108 parts of benzoquinone in 500 parts of water and 100 parts of sodium bicarbonate in the course of about 3 hours while cooling externally with ice. Condensation takes place with the evolution of gas and the generation of heat and the formation of a brown yellow precipitate. The temperature is about 5–20° C. The diazonium solution is continuously consumed. When the whole of the diazonium solution has been run in the mixture is stirred for about 1 hour longer and then filtered. The moist filter cake is then stirred in 500 parts of chlorobenzene and 500 parts of water, and 300 parts of sodium hydrosulphite are added in one batch. The solution becomes paler in color and heats up spontaneously to about 50° C. When the temperature has dropped again of its own accord, the mixture is subjected to distillation with steam until all the chlorobenzene has been driven off, and then the mixture is cooled and filtered to separate the pale brown or almost white precipitate. For the purpose of ring closure the precipitate is introduced into a melt of 500 parts of caustic alkali and 100 parts of water at 170° C. A brown salt mass forms in the melt. It is maintained at 180° C. for ¼ hour longer and then poured into 6000 parts of water. Undissolved material is removed by filtration and the solution is acidified. The resulting precipitate is separated by filtration and dried. For the purpose of purification it is crystallized from chlorobenzene. 4-methoxy-7-hydroxy-1:9-benzoxanthene of the formula

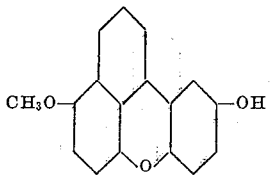

is obtained in the form of pale yellow needles or plates melting at 204-206° C. Solutions of the product in organic solvents are pale yellow and have a violet-blue fluorescence. The product dissolves in concentrated sulfuric acid with a yellow coloration and a green fluorescence, and in dilute solutions of caustic alkali with a yellow coloration and a feeble green fluorescence.

Condensation products are obtained in an analogous manner by reacting a diazotized 1-chloro-8-aminonaphthalene with α-naphthoquinone or a substituted quinone, for example, monochloroquinone. Thus, the product of the reaction between the diazotized 1-chloro-8-aminonaphthalene and α-naphthoquinone is a 1:9-benzoxanthene which carries a hydroxyl group in 7-position and a fused-on benzene ring in the positions 5:6 (positions 8:9 according to the Patterson numbering):

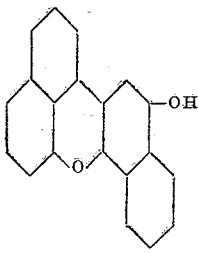

It is to be understood that in the preceding examples sodium hydroxide has been uniformly used as agent capable of eliminating hydrohalic acid because of its low price and good performance, but other agents may be used if desired, such as other alkali metal hydroxides, for example, potassium hydroxide, alkaline earth metal hydroxides, and especially silver hydroxide.

Having thus described the invention, what is claimed is:

1. A compound selected from the group consisting of 7-hydroxy-1:9-benzoxanthene, 2-chloro-7-hydroxy-1:9-benzoxanthene and 4-methoxy-7-hydroxy-1:9-benzoxanthene.
2. 7-hydroxy-1:9-benzoxanthene.
3. 2-chloro-7-hydroxy-1:9-benzoxanthene.
4. 4-methoxy-7-hydroxy-1:9-benzoxanthene.
5. Process for the manufacture of a 7-hydroxy-1:9-benzoxanthene which comprises heating a member selected from the group consisting of 1-chloro-8-(2':5'-dihydroxy)-1'-phenyl-naphthalene, 1:4-dichloro-8-(2':5'-dihydroxy)-1'-phenyl-naphthalene and 2-methoxy-1-chloro-8-(2':5'-dihydroxy)-1'-phenyl-naphthalene with sodium hydroxide.
6. Process for the manufacture of 7-hydroxy-1:9-benzoxanthene which comprises heating 1-chloro-8-(2':5'-dihydroxy)-1'-phenyl-naphthalene with sodium hydroxide.
7. Process for the manufacture of 2-chloro-7-hydroxy-1:9-benzoxanthene which comprises heating 1:4-dichloro-8-(2':5'-dihydroxy)-1'-phenyl-naphthalene with sodium hydroxide.
8. Process for the manufacture of 4-methoxy-7-hydroxy-1:9-benzoxanthene which comprises heating 2-methoxy-1-chloro-8-(2':5'-dihydroxy)-1'-phenyl-naphthalene with sodium hydroxide.

MAX SCHMID.
HANS JOHNER.

REFERENCES CITED

The following references are of record in the file of this patent:

Ghigi: Chemical Abstracts, vol. 33, pp. 9304 and 10359 (1939).